US008819010B2

(12) United States Patent
Fankhauser et al.

(10) Patent No.: US 8,819,010 B2
(45) Date of Patent: Aug. 26, 2014

(54) EFFICIENT REPRESENTATION OF DATA LINEAGE INFORMATION

(75) Inventors: Michael Fankhauser, DN Karkur (IL); Joanne Friedman, Efrat (IL); Benjamin Halberstadt, Jerusalem (IL); Roger Kenneth Hecker, Efrat (IL)

(73) Assignee: International Business Machines Corporation, Armonk, NY (US)

( * ) Notice: Subject to any disclaimer, the term of this patent is extended or adjusted under 35 U.S.C. 154(b) by 869 days.

(21) Appl. No.: 12/825,220

(22) Filed: Jun. 28, 2010

(65) Prior Publication Data

US 2011/0320460 A1   Dec. 29, 2011

(51) Int. Cl.
*G06F 7/00* (2006.01)

(52) U.S. Cl.
USPC .......................................... 707/736; 707/802

(58) Field of Classification Search
None
See application file for complete search history.

(56) References Cited

U.S. PATENT DOCUMENTS

| 6,675,253 | B1 * | 1/2004 | Brinkmann et al. | 710/316 |
| 8,515,911 | B1 * | 8/2013 | Zhou et al. | 707/638 |
| 2005/0015377 | A1 * | 1/2005 | Wan | 707/10 |
| 2005/0198073 | A1 | 9/2005 | Becks et al. | |
| 2006/0080369 | A1 * | 4/2006 | Razdow et al. | 707/204 |
| 2007/0156787 | A1 | 7/2007 | MacGregor | |
| 2007/0255574 | A1 | 11/2007 | Polo-Malouvier et al. | |
| 2008/0104060 | A1 | 5/2008 | Abhyankar et al. | |
| 2008/0183658 | A1 | 7/2008 | Mangipudi | |
| 2009/0012983 | A1 | 1/2009 | Senneville et al. | |
| 2009/0030880 | A1 * | 1/2009 | Melamed | 707/3 |
| 2009/0063534 | A1 | 3/2009 | Halberstadt | |
| 2009/0172006 | A1 | 7/2009 | Ducaula et al. | |
| 2009/0182780 | A1 * | 7/2009 | Wong et al. | 707/200 |
| 2010/0114628 | A1 * | 5/2010 | Adler et al. | 705/7 |

OTHER PUBLICATIONS

Cui, "Lineage Tracing in Data Warehouses", A Dissertation Submitted to the Department of Computer Science and the Committee on Graduate Studies of Stanford University, Dec. 2001, Total 208 pp.

* cited by examiner

*Primary Examiner* — Fred I Ehichioya
*Assistant Examiner* — Hasanul Mobin
(74) *Attorney, Agent, or Firm* — Janaki K. Davda; Konrad, Raynes, Davda & Victor LLP (57) ABSTRACT

Presenting data lineage information by assigning a score to a data asset along a path between a data source and a data destination, where a predefined scoring function is applied to a characteristic of the data asset, and presenting via a computer-controlled output medium a description of the data source, the data destination, and the path between the data source and the data destination, where the description includes the data asset if the score meets predefined inclusion criteria.

18 Claims, 5 Drawing Sheets

EFFICIENT REPRESENTATION OF DATA LINEAGE INFORMATION

FIELD

The invention relates to data analysis in general, and more particularly to efficiently representing data lineage information in support thereof.

BACKGROUND

It is often useful for managers and end-users of data within an organization to understand the lineage of such data by analyzing where the data originate, where and how the data are transformed, and where the data flow within the organization. Tools such as the INFOSPHERE™ METADATA WORKBENCH, commercially-available from International Business Machines Corporation, Armonk, N.Y., support this type of data lineage analysis by modeling and analyzing an organization's data infrastructure, including Business Intelligence (BI) reporting layers, Online Analytical Processing (OLAP) layers, data marts, data warehouses, staging databases, intermediate files, file transfer processes, Extract-Transform-Load (ETL) processes, and operational data stores. (INFOSPHERE is a registered trademark or common law mark of International Business Machines Corporation in the United States and/or other countries.) The information produced during a data lineage analysis is often detailed and complex, enumerating all of the databases, files, systems, and transformations that lie along the various paths between the data sources and destinations that are within the scope of the analysis. However, data managers and end-users do not always require such comprehensive data lineage information for their purposes, and may even find sifting through comprehensive data lineage information to be an inefficient endeavor.

BRIEF SUMMARY

In certain embodiments, a method is provided for presenting data lineage information, the method including assigning a score to a data asset along a path between a data source and a data destination by applying a predefined scoring function to a characteristic of the data asset, and presenting via a computer-controlled output medium a description of the data source, the data destination, and the path between the data source and the data destination, where the description includes the data asset only if the score meets predefined inclusion criteria.

In certain embodiments, a method is provided for presenting data lineage information, the method including assigning a score to a plurality of data assets included in the results of a data lineage analysis, evaluating the scores using predefined data lineage filtering criteria, including in a filtered version of the data lineage analysis results any of the data assets having a score that meets predefined data lineage filtering criteria for inclusion in the filtered data lineage analysis results, and presenting the filtered data lineage analysis results via a computer-controlled output medium.

In other embodiments, system and computer program products are provided, configured to implement the methods of the invention.

BRIEF DESCRIPTION OF THE SEVERAL VIEWS OF THE DRAWINGS

Embodiments will be understood and appreciated more fully from the following detailed description taken in conjunction with the appended drawings in which.

DETAILED DESCRIPTION

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks. The code implementing the described operations may further be implemented in hardware logic or circuitry (e.g., an integrated circuit chip, Programmable Gate Array (PGA), Application Specific Integrated Circuit (ASIC), etc.

Figure 1:
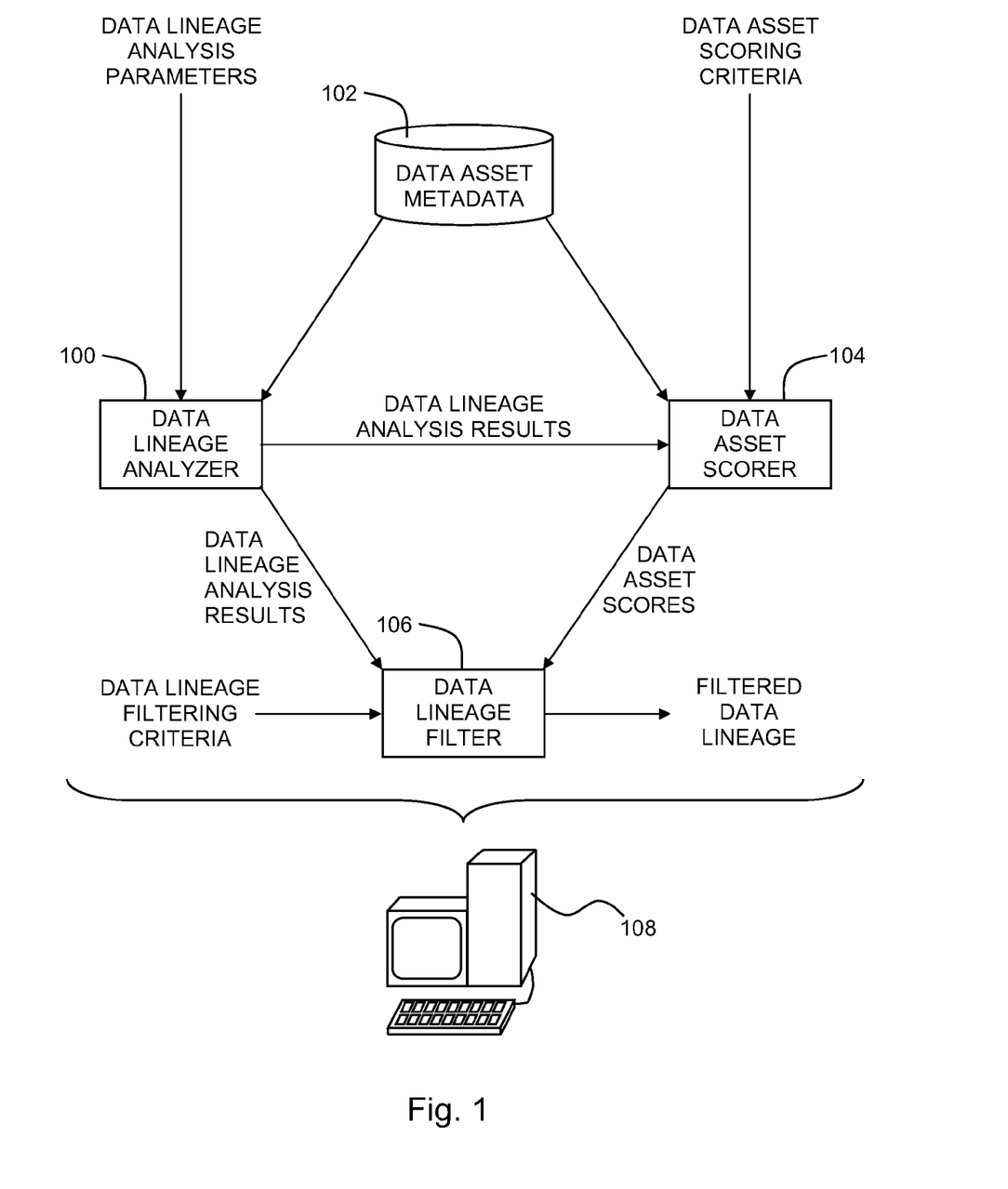
FIG. 1 is a simplified conceptual illustration of a system for efficient representation of data lineage information, constructed and operative in accordance with embodiments of the invention.

Reference is now made to FIG. 1 which is a simplified conceptual illustration of a system for efficient representation of data lineage information, constructed and operative in accordance with embodiments of the invention. In the system of FIG. 1 a data lineage analyzer 100 is configured to employ conventional techniques to perform data lineage analysis, such as where data lineage analyzer 100 performs data lineage analysis in accordance with data lineage analysis parameters as applied to a predefined set of data asset metadata 102.

A data asset scorer 104 is configured to assign a score to any, and preferably every, data asset included in data lineage analysis results provided by data lineage analyzer 100. Data asset scorer 104 is preferably configured to assign a data asset score to a data asset by applying a predefined scoring function to one or more characteristics of the data asset, such as may be known from data asset metadata 102, in accordance with one or more data asset scoring criteria. A data lineage filter 106 is configured to filter data lineage analysis results provided by data lineage analyzer 100 by using predefined data lineage filtering criteria to evaluate the scores provided by data asset scorer 104 of the data assets included in data lineage analysis results provided by data lineage analyzer 100. Those data assets having a score that meets data lineage filtering criteria for inclusion in filtered data lineage analysis results are preferably presented via a computer-controlled output medium, such as a computer display or printout.

Any of the elements shown in FIG. 1 are preferably executed by or otherwise made accessible to a computer 108, such as by implementing any of the elements in computer hardware and/or in computer software embodied in a physically-tangible, computer-readable medium in accordance with conventional techniques.

The system of FIG. 1 may be appreciated in the context of the following example, where a data asset receives a score calculated as the aggregate of points that the data asset receives according to the following point schedule:

5 points if the asset has a business name;

10 points if the asset has a business term;

5 points if the asset has a steward;

5 points if the asset is a data source, and has had a data quality check run on it;

5 points if the asset is part of a business analyst's mapping document;

10 points if the asset being monitored in the context of a compliance project;

5 points if the asset has a description.

Although in this example points are used and are aggregated to form a data assert score, it will be appreciated that any scoring system may be used.

Figure 2A:
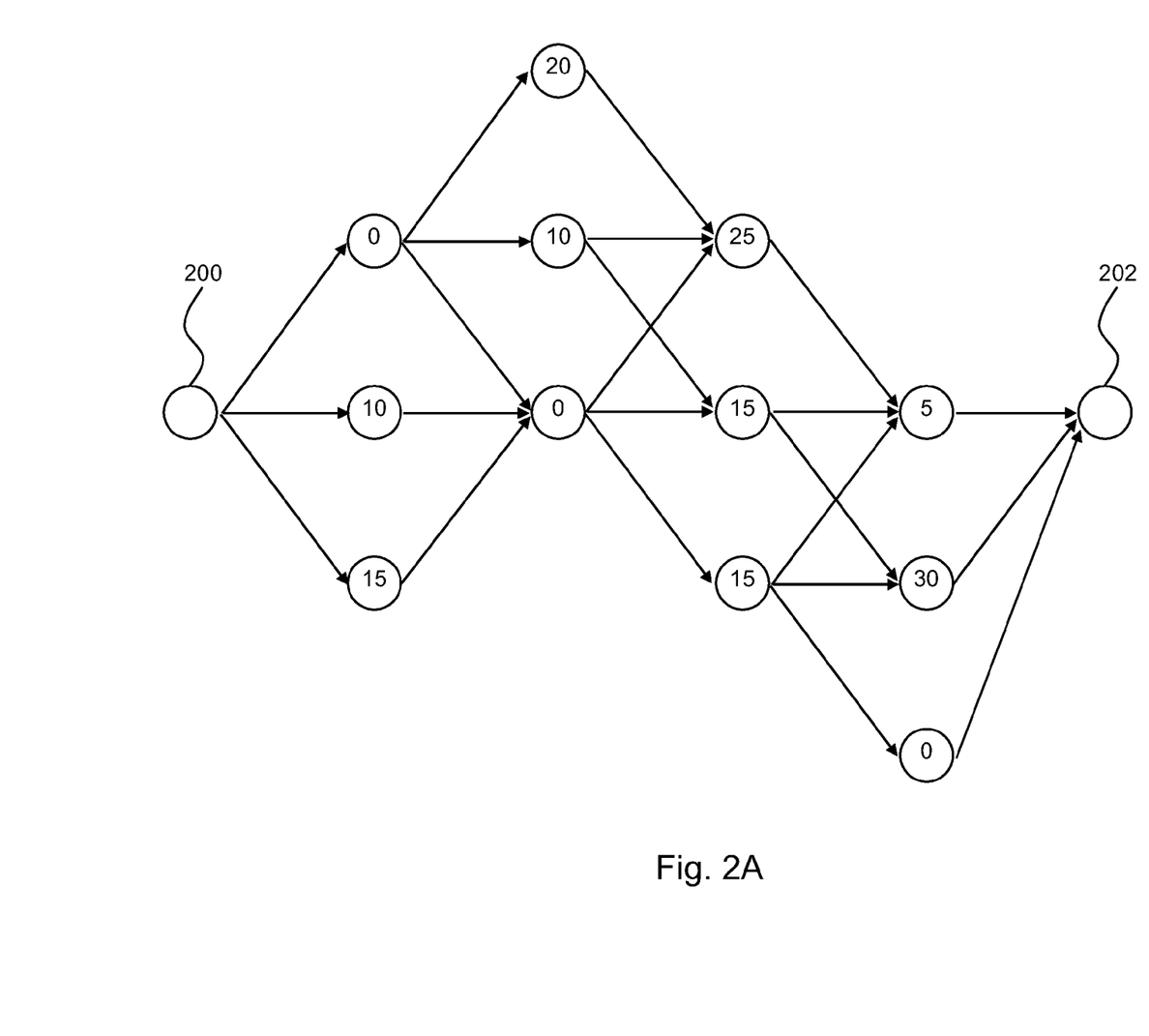
FIGS. 2A and 2B are exemplary data lineage graphs, constructed in accordance with embodiments of the invention.

An exemplary data lineage graph of data lineage analysis results is shown in FIG. 2A, where multiple paths are shown from a data source 200 to a data destination 202, and where data assets that lie along the paths are represented as nodes in the graph. The data lineage graph is shown in FIG. 2A represents exemplary results provided by data lineage analyzer 100. In FIG. 2A, each data asset/node is shown together with its score as provided by data asset scorer 104.

Figure 2B:
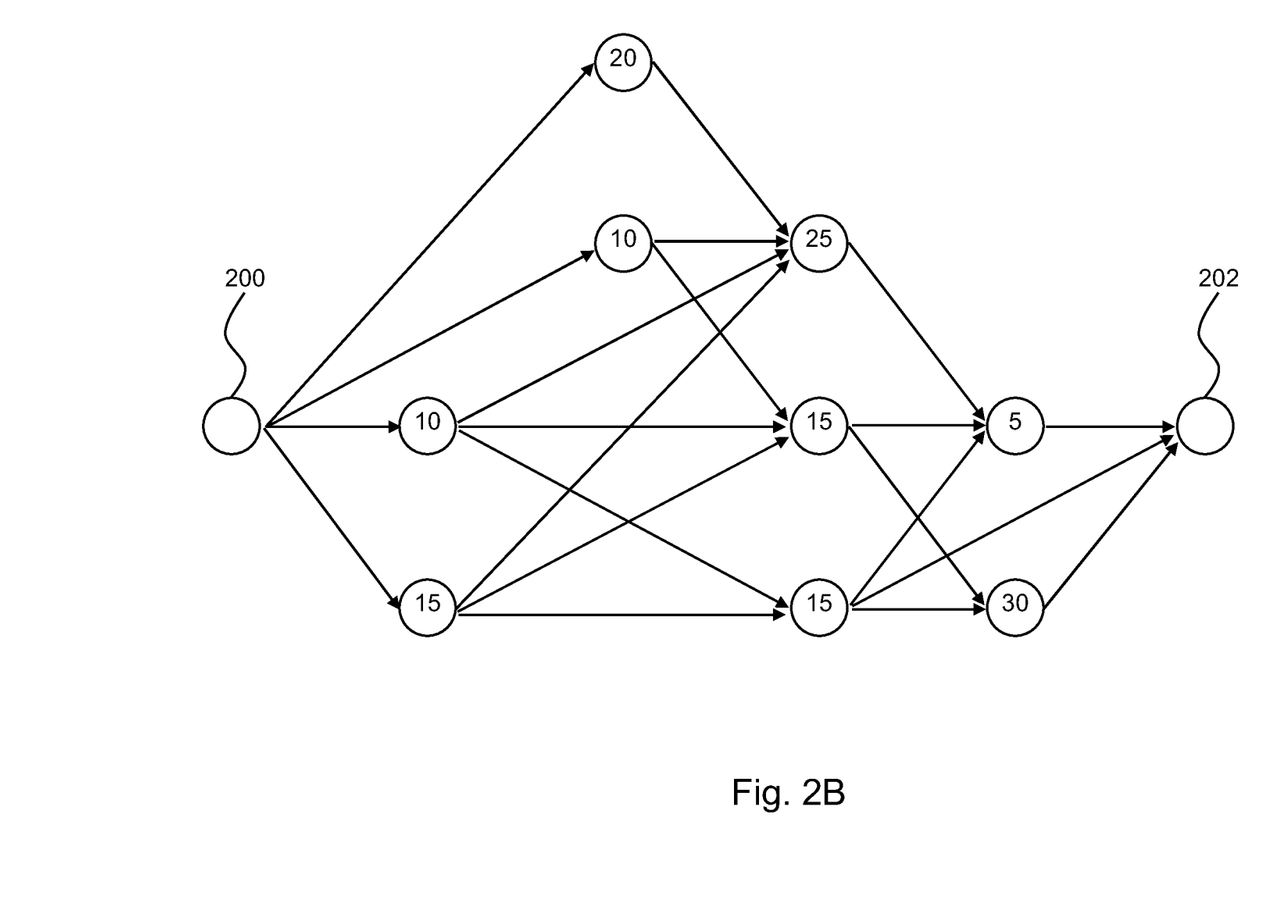

An exemplary data lineage graph of filtered data lineage analysis results is shown in FIG. 2B, where data assets/nodes from the data lineage graph shown in FIG. 2A are included in the data lineage graph shown in FIG. 2B only if their scores meet data lineage filtering criteria for inclusion, such as the following criteria:

An asset having an aggregate score greater than or equal to 20 is considered to have business relevance and will be included in the data lineage result;

An asset having an aggregate score greater than 0 and less than 20 are considered to have potential business relevance. The assets will be included in the lineage result only if they are needed to make the lineage path have an end-to-end depth of at least 3 arcs and 4 nodes. The assets with potential business relevance will be included based on their score, the highest score first until the result has this depth. Once the result has an end-to-end depth 3 arcs and 4 nodes the remaining assets do not qualify to be added to the data lineage result.

Figure 3:
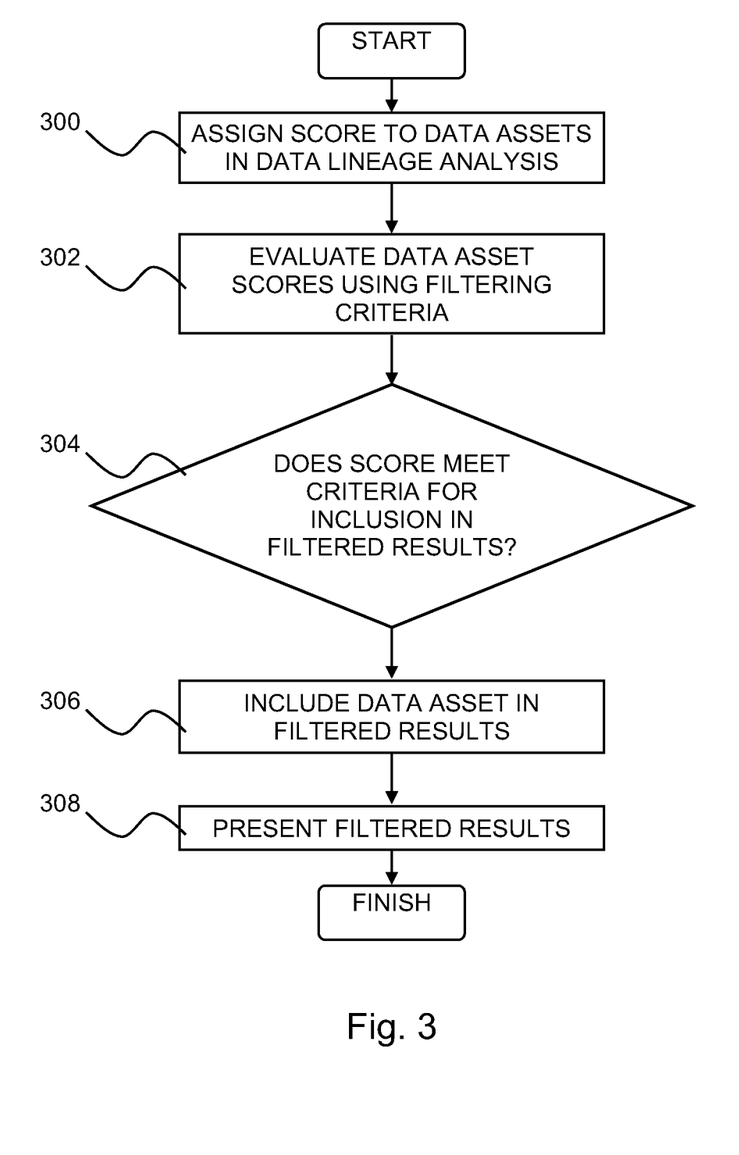
FIG. 3 is a simplified flowchart illustration of an exemplary method of operation of the system of FIG. 1, operative in accordance with embodiments of the invention.

Reference is now made to FIG. 3, which is a simplified flowchart illustration of an exemplary method of operation of the system of FIG. 1, operative in accordance with embodiments of the invention. In the method of FIG. 3, a score is assigned to any, and preferably every, data asset included in the results of a data lineage analysis, preferably by applying a predefined scoring function to one or more characteristics of the data asset in accordance with one or more data asset scoring criteria (block 300). Predefined data lineage filtering criteria are used to evaluate the data asset scores (block 302). If a data asset has a score that meets data lineage filtering criteria for inclusion in filtered data lineage analysis results (block 304), the data asset is included in the filtered data lineage analysis results (block 306), which are preferably presented via a computer-controlled output medium (block 308).

Figure 4:
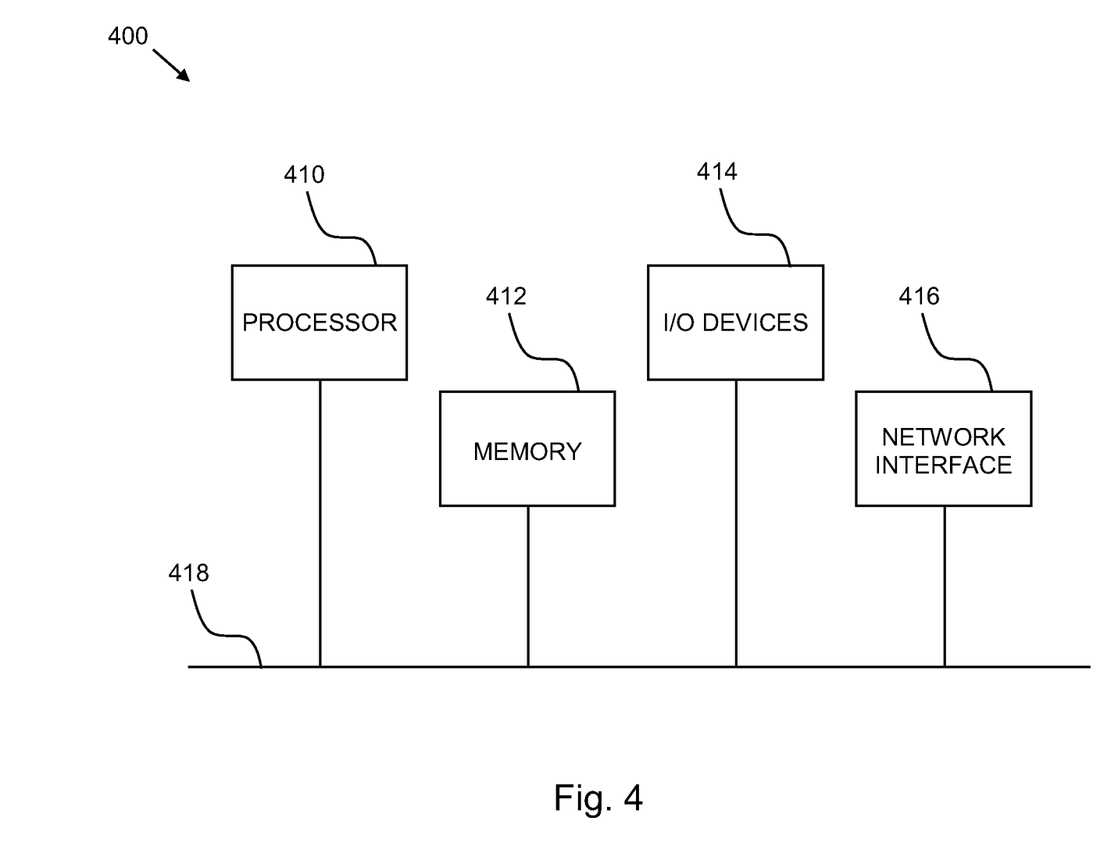
FIG. 4 is a simplified block diagram illustrating an exemplary hardware implementation of a computing system, constructed and operative in accordance with embodiments of the invention.

Referring now to FIG. 4, block diagram 400 illustrates an exemplary hardware implementation of a computing system in accordance with which one or more components/methodologies of the invention (e.g., components/methodologies described in the context of the drawing figures shown and described herein) may be implemented, according to an embodiment of the invention.

As shown, the techniques for controlling access to at least one resource may be implemented in accordance with a processor 410, a memory 412, I/O devices 414, and a network interface 416, coupled via a computer bus 418 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for presenting data lineage information, the method comprising:

assigning, using a processor of a computer, a score to each data asset in a set of data assets along a data lineage path in a data lineage graph between a data source and a data destination by applying a scoring function to one or more characteristics of the data asset;

identifying a subset of the set of data assets whose score meets inclusion criteria, wherein each data asset whose score exceeds a first threshold is included in the subset and one or more additional data assets whose scores exceed a second threshold and are below the first threshold are included in the subset in response to determining that these one or more additional data assets are to be used to meet a certain depth for the data lineage path; and presenting via a computer-controlled output medium a description of the data source, the data destination, and the path between the data source and the data destination, wherein the path includes the subset of the data assets.

2. The method of claim 1 wherein the assigning further comprises:

applying the scoring function to characteristics from the one or more characteristics of the data asset, wherein the score comprises an aggregation of values associated with the one or more characteristics.

3. The method of claim 1 and further comprising:

performing data lineage analysis on the set of data assets to produce data lineage analysis results.

4. A method for presenting data lineage information, the method comprising:

assigning, using a processor, a score to each data asset in a plurality of data assets included along a data lineage path in a data lineage graph between a data source and a data destination in data lineage analysis results by applying a scoring function to one or more characteristics of the data asset;

evaluating each score using data lineage filtering criteria;

based on the evaluating, identifying a subset of the plurality of data assets whose score meets the data lineage filtering criteria, wherein each data asset whose score exceeds a first threshold is included in the subset and one or more additional data assets whose scores exceed a second threshold and are below the first threshold are included in the subset in response to determining that these one or more additional data assets are to be used to meet a certain depth for the data lineage path; and presenting the data lineage analysis results via a computer-controlled output medium as a filtered data lineage graph with the subset of the plurality of data assets.

5. The method of claim 4 wherein each score comprises an aggregation of values associated with the one or more characteristics of the data asset.

6. The method of claim 4 and further comprising;
performing data lineage analysis on the plurality of data assets to produce the data lineage analysis results.

7. A system for presenting data lineage information, the system comprising:
a processor;
storage coupled to the processor; wherein the storage stores computer program instructions, and wherein the computer program instructions are executed by the processor to perform operations, and wherein the operations comprise:
assigning, using a processor of a computer, a score to each data asset in a set of data assets along a data lineage path in a data lineage graph between a data source and a data destination by applying a scoring function to one or more characteristics of the data asset;
identifying a subset of the set of data assets whose score meets inclusion criteria, wherein each data asset whose score exceeds a first threshold is included in the subset and one or more additional data assets whose scores exceed a second threshold and are below the first threshold are included in the subset in response to determining that these one or more additional data assets are to be used to meet a certain depth for the data lineage path; and
presenting via a computer-controlled output medium a description of the data source, the data destination, and the path between the data source and the data destination, wherein the path includes the subset of the data assets.

8. The system of claim 7 wherein the operations further comprise:
applying the scoring function to characteristics from the one or more characteristics of the data asset, wherein the score comprises an aggregation of values associated with the one or more characteristics.

9. The system of claim 7 wherein the operations further comprise:
performing data lineage analysis on the set of data assets to produce data lineage analysis results.

10. A system for presenting data lineage information, the system comprising:
a processor;
storage coupled to the processor; wherein the storage stores computer program instructions, and wherein the computer program instructions are executed by the processor to perform operations, and wherein the operations comprise:
assigning a score to each data asset in a plurality of data assets included along a data lineage path in a data lineage graph between a data source and a data destination in data lineage analysis results by applying a scoring function to one or more characteristics of the data asset;
evaluating each score using data lineage filtering criteria;
based on the evaluating, identifying a subset of the plurality of data assets whose score meets the data lineage filtering criteria, wherein each data asset whose score exceeds a first threshold is included in the subset and one or more additional data assets whose scores exceed a second threshold and are below the first threshold are included in the subset in response to determining that these one or more additional data assets are to be used to meet a certain depth for the data lineage path; and
presenting the data lineage analysis results via a computer-controlled output medium as a filtered data lineage graph with the subset of the plurality of data assets.

11. The system of claim 10 wherein each score comprises an aggregation of values associated with the one or more characteristics of the data asset.

12. The system of claim 10 wherein the operations further comprise:
performing data lineage analysis on the plurality of data assets to produce the data lineage analysis results.

13. A computer program product for presenting data lineage information, the computer program product comprising a computer-readable storage device with computer-readable program code embodied in the computer-readable storage device, wherein the computer-readable program code, when executed by a processor of a computer, is configured to:
assign a score to each data asset in a set of data assets along a data lineage path in a data lineage graph between a data source and a data destination by applying a scoring function to one or more characteristics of the data asset;
identify a subset of the set of data assets whose score meets inclusion criteria, wherein each data asset whose score exceeds a first threshold is included in the subset and one or more additional data assets whose scores exceed a second threshold and are below the first threshold are included in the subset in response to determining that these one or more additional data assets are to be used to meet a certain depth for the data lineage path; and
present via a computer-controlled output medium a description of the data source, the data destination, and the path between the data source and the data destination, wherein the path includes the subset of the data assets.

14. A computer program product for presenting data lineage information, the computer program product comprising a computer-readable storage device with computer-readable program code embodied in the computer-readable storage device, wherein the computer-readable program code, when executed by a processor of a computer, is configured to:
assign a score to each data asset in a plurality of data assets included in data lineage analysis results by applying a scoring function to one or more characteristics of the data asset;
evaluate each score using data lineage filtering criteria;
based on the evaluating, identifying a subset of the plurality of data assets whose score meets the data lineage filtering criteria, wherein each data asset whose score exceeds a first threshold is included in the subset and one or more additional data assets whose scores exceed a second threshold and are below the first threshold are included in the subset in response to determining that these one or more additional data assets are to be used to meet a certain depth for the data lineage path; and
present the data lineage analysis results via a computer-controlled output medium as a filtered data lineage graph with the subset of the plurality of data assets.

15. The computer program product of claim 14 wherein each score comprises an aggregation of values associated with the one or more characteristics of the data asset.

16. The computer program product of claim 14 and wherein the computer-readable program code, when executed by the processor of the computer, is configured to:
perform data lineage analysis on the plurality of data assets to produce the data lineage analysis results.

17. The computer program product of claim 13 wherein the computer-readable program code, when executed by the processor of the computer, is configured to:
  apply the scoring function to characteristics from the one or more characteristics of the data asset, wherein the score comprises an aggregation of values associated with the one or more characteristics.

18. The computer program product of claim 13 wherein the computer-readable program code, when executed by the processor of the computer, is configured to:
  perform data lineage analysis on the set of data assets to produce data lineage analysis results.

* * * * *